United States Patent
Gentile et al.

(10) Patent No.: US 11,134,301 B2
(45) Date of Patent: Sep. 28, 2021

(54) METHOD AND SYSTEM OF DATA POLLING FOR AUGMENTED/MIXED REALITY APPLICATIONS

(71) Applicant: JUJO, INC., A DELAWARE CORPORATION, Boulder, CO (US)

(72) Inventors: Antonio Gentile, Boulder, CO (US); Andrei Khurshudov, Niwot, CO (US); Rafael Gutierrez, Lafayette, CO (US)

(73) Assignee: JUJO, INC., A DELAWARE CORPORATION

( * ) Notice: Subject to any disclaimer, the term of this patent is extended or adjusted under 35 U.S.C. 154(b) by 0 days.

(21) Appl. No.: 16/743,640

(22) Filed: Jan. 15, 2020

(65) Prior Publication Data

US 2020/0162785 A1     May 21, 2020

Related U.S. Application Data (60) Provisional application No. 62/767,683, filed on Nov. 15, 2018.

(51) Int. Cl.
| | | |
|---|---|---|
| *H04N 21/431* | (2011.01) | |
| *G06T 19/00* | (2011.01) | |
| *G06F 13/22* | (2006.01) | |
| *G06F 3/0486* | (2013.01) | |
| *G16Y 40/10* | (2020.01) | |

(52) U.S. Cl.
CPC ....... *H04N 21/4312* (2013.01); *G06F 3/0486* (2013.01); *G06F 13/22* (2013.01); *G06T 19/006* (2013.01); *G16Y 40/10* (2020.01)

(58) Field of Classification Search
CPC .. H04N 21/4312; G06N 5/022; G06T 19/006; G06K 9/00671
See application file for complete search history.

(56) References Cited

U.S. PATENT DOCUMENTS

| | | |
|---|---|---|
| 8,854,546 B2 | 10/2014 | Tkachenko |
| 9,871,991 B2 | 1/2018 | Sirpal et al. |
| 10,123,073 B2 | 11/2018 | Cremer et al. |
| 2011/0053688 A1* | 3/2011 | Crawford ................. A63D 5/04 463/31 |

(Continued)

*Primary Examiner* — Yi Yang
(74) *Attorney, Agent, or Firm* — Jason P. Webb; Pearson Butler (57) ABSTRACT

A method and system of systematic data polling/processing within a networked computing system for augmented/mixed reality display. Including: establishing an overlay governed data stream from a persistent data storage system to an augmented/mixed reality (AR/MR) display device; receiving, over a network, pushed metric data from a plurality of remote IoT devices that are associated with networked assets, the plurality of remote IoT devices not all having the same push frequency, wherein location information of the networked assets is known to the networked computing system; storing received pushed metric data within the persistent data storage system; polling the persistent data storage system for data points from the pushed metric data; generating an overlay template; and/or publishing the pushed metric data that has been polled to the AR/MR display device according to the overlay governed data stream in association with the location data of the remote IoT devices.

5 Claims, 9 Drawing Sheets

(56) References Cited

U.S. PATENT DOCUMENTS

| | | | |
|---|---|---|---|
| 2011/0221656 A1* | 9/2011 | Haddick | G06F 3/017 |
| | | | 345/8 |
| 2012/0116197 A1* | 5/2012 | Moberg | A61M 5/14244 |
| | | | 600/365 |
| 2012/0185905 A1 | 7/2012 | Kelley et al. | |
| 2014/0320529 A1* | 10/2014 | Roberts | G06T 19/20 |
| | | | 345/633 |
| 2015/0088937 A1 | 3/2015 | Lons et al. | |
| 2015/0302623 A1* | 10/2015 | Ishikawa | G06F 3/011 |
| | | | 345/629 |
| 2016/0275093 A1* | 9/2016 | Majoch | G06F 16/958 |
| 2018/0262394 A1* | 9/2018 | Sakura | H04W 4/50 |
| 2019/0019090 A1* | 1/2019 | Chacko | G06Q 10/06 |
| 2019/0026635 A1 | 1/2019 | Wang et al. | |
| 2019/0180511 A1 | 6/2019 | Gordon et al. | |
| 2019/0281343 A1 | 9/2019 | Hussain et al. | |
| 2019/0313146 A1 | 10/2019 | Kakuschke et al. | |

* cited by examiner

METHOD AND SYSTEM OF DATA POLLING FOR AUGMENTED/MIXED REALITY APPLICATIONS

CROSS-REFERENCE TO RELATED APPLICATIONS

This invention claims priority, under 35 U.S.C. § 120, to the U.S. Provisional Patent Application No. 62/767,683 by Gentile et al. filed on 15 Nov. 2018, which is incorporated by reference herein in its entirety.

BACKGROUND OF THE INVENTION

Field of the Invention

The present invention relates to data processing systems and methods, specifically to data processing system and methods for use in augmented/mixed reality systems.

Description of the Related Art

Internet of Things (IoT) devices are generally understood and being devices having sensors that can transmit data over a network, generally the internet, but not necessarily. IoT devices may include wireless sensors, actuators, and even more complicated computing devices (e.g. smart speakers, TVs, wearables, thermostats). They are generally attached to objects, which allows for monitoring and/or control of such objects. These devices may be used within one or more networks for plethoric uses, e.g. personal, home, business, industrial, and government.

The networking, communication and connectivity protocols used with internet-enabled devices largely depend on the specific IoT application deployed. Just as there are many different IoT applications, there are many different connectivity and communications options. Communications protocols include, but are not limited to: CoAP, DTLS and MQTT. Wireless protocols include IPv6, LPWAN, Zigbee, Bluetooth Low Energy, Z-Wave, RFID and NFC. Cellular, satellite, Wi-Fi and Ethernet can also be used. Each option has its tradeoffs in terms of power consumption, range and bandwidth, all of which may be considered when choosing connected devices and protocols for a particular IoT application. To share the sensor data they collect, IoT devices generally connect to an IoT gateway or another edge device where data can either be analyzed locally or sent to the cloud for analysis.

IoT development is driving application development, including user interface development for various implementations of IoT systems/networks. Non-limiting examples include smartphone applications to manage IoT smart home implementations which may include menu driven options for temperature/lighting control, viewing video feed data from cameras, security alerts/alarms pushed to the smartphone of the user, and the like.

There are also user interfaces that are not menu driven, such as but not limited to sound-controlled interfaces (e.g. activated by knocking/clapping), button-controlled interffices, Augmented Reality/Mixed Reality interfaces e.g. network connected AR/MR eyewear using software to interpret hand gestures), and in-ear interfaces with accelerometers/gyroscopes that interpret nodding gestures as commands.

Some IoT implementations are very simple, with relatively few devices connected and control of those few devices is associated with meeting specific needs of individuals, such as in the control of a smart home by the resident(s) thereof to meet their needs of comfort, convenience, and/or safety. Some IoT implementations are much more complex, as in many industrial implementations, wherein teams of users monitor control panels and maintain complex operational protocols with assistance from their IoT network(s).

Polling is the process where the computer or controlling device waits for an external device to check for its readiness or state, often with low-level hardware. For example, when a printer is connected via a parallel port, the computer waits until the printer has received the next character. These processes can be as minute as only reading one bit. This is sometimes used synonymously with busy-wait polling. In this situation, when an I/O operation is required, the computer does nothing other than check the status of the I/O device until it is ready, at which point the device is accessed. In other words, the computer waits until the device is ready. Polling also refers to the situation where a device is repeatedly checked for readiness, and if it is not, the computer returns to a different task. Although not as wasteful of CPU cycles as busy waiting, this is generally not as efficient as the alternative to polling, interrupt-driven I/O.

In a simple single-purpose system, even busy-wait is perfectly appropriate if no action is possible until the I/O access, but more often than not this was traditionally a consequence of simple hardware or non-multitasking operating systems.

Polling is often intimately involved with very low-level hardware. For example, polling a parallel printer port to check whether it is ready for another character involves examining as little as one bit of a byte. That bit represents, at the time of reading, whether a single wire in the printer cable is at tow or high voltage. The I/O instruction that reads this byte directly transfers the voltage state of eight real world wires to the eight circuits (clip flops) that make up one byte of a CPU register.

A polling cycle is the time in which each element is monitored once. The optimal polling cycle will vary according to several factors, including the desired speed of response and the overhead processor time and bandwidth) of the polling.

In roll call polling, the polling device or process queries each element on a list in a fixed sequence. Because it waits for a response from each element, a timing mechanism is necessary to prevent lock-ups caused by non-responding elements. Roll call polling can be inefficient if the overhead for the polling messages is high, there are numerous elements to be polled in each polling cycle and only a few elements are active.

In hub polling, also referred to as token polling, each element polls the next element in some fixed sequence. This continues until the first element is reached, at which time the polling cycle starts all over again.

Polling can be employed in various computing contexts in order to control the execution or transmission sequence of the elements involved. For example, in multitasking operating systems, polling can be used to allocate processor time and other resources to the various competing processes.

In networks, polling is used to determine which nodes want to access the network. It is also used by routing protocols to retrieve routing information, as is the case with EGP (exterior gateway protocol).

An alternative to polling is the use of interrupts, which are signals generated by devices or processes to indicate that they need attention, want to communicate, etc. Although polling can be very simple, in many situations (e.g., multitasking operating systems) it is more efficient to use interrupts because it can reduce processor usage and/or bandwidth consumption. Polling has the disadvantage that if there are too many devices to check, the time required to poll them can exceed the time available to service the I/O device.

Both IoT and AR/MR systems are in stages of rapid improvement and development along many modes of implementation. Some improvements have been made in the field. Examples of references related to the present invention are described below in their own words, and the supporting teachings of each reference are incorporated by reference herein:

U.S. Pat. No. 9,871,991, issued to Sirpal et al., discloses electronic devices, processes and systems for configuration of a display device. In one embodiment, a method for configuring operation of a display device includes receiving a configuration change from a control device, wherein the configuration change includes one or more changes for presentation of a overlay element for the display device and configuring settings for presentation of a overlay element, wherein the configuration change corresponds to a release of one or more features previously included and inaccessible to settings for presentation of the overlay element by the display device. The method also includes presenting an overlay element based on the configuring, wherein the overlay element is presented by the display device as an overlay to displayed image content. Overlay elements can include a navigation bar, an animation, a poster display, sticker display, and an application home screen.

U.S. Pat. No. 8,854,546, issued to Tkachenko, discloses a method of displaying input data content, the input data content comprising video data placed in a video plane and overlay data placed in an overlay plane, said method comprising the steps of: shifting the video plane compared to the overlay plane so as the overlay plane does not occult the video plane, mixing the resulting shifted video plane and overlay plane, for generating output data content, and displaying said output data content.

U.S. Pat. No. 10,123,073, issued to Cremer et al., discloses wherein a client device accesses a video input stream from an intermediate device for display. The client device analyzes the video input stream to determine that the video input stream matches a template indicating a portion of the video input stream that is created by the intermediate device. Based on the video input stream matching the template, a video output stream generated by the client device is modified to include the portion of the video input stream generated by the intermediate device. For example, commercials transmitted from a national content provider to a smart TV via a set-top box may be replaced with targeted commercials. During the replacement, informational messages or menus generated by the set-top box may be detected and the replacement video altered by the smart TV to include the messages or menus generated by the set-top box.

U.S. Patent Application Publication No.: 2019/0281343A1, by Hussain et al., discloses methods for a marketplace of interactive live streaming multimedia overlays. At least one method includes a user playing video games on a computer, using software to stream all or part of their computer session to one or more streaming services, said software retrieving images from a web-service, some or all of said images having been acquired through an online marketplace, said images being used to create a video overlay, and said overlay being combined with the video of the user's computer session prior being encoded for transmission to one or more streaming services.

U.S. Patent Application Publication No.: 2019/0313146, by Kakuschke et al., discloses a system and methods for interactive filters in live streaming multimedia. At least one method includes a user playing video games on a computer, using streaming software to combine all or part of their computer session with their local camera feed, using streaming software to encode and stream the encoded video to one or more streaming services, streaming services displaying the video stream to one or more viewers, said viewers interacting with the video via the streaming service, the user's streaming software retrieving data about viewer interactions, the streaming software using a computer vision algorithm to detect the position of an object in the user's camera feed, such as the user's face or hands, the streaming software retrieving animation code, the streaming software using the detected position of the detected object to generate a graphical image that aligns with and follows the detected object in the local camera feed, the streaming software adding the graphical image to the video stream in direct response to viewer interactions, and said graphical image being inserted into the video stream prior to the video being published for viewers to consume by the streaming service.

The inventions heretofore known suffer from a number of disadvantages which include having poor network efficiency, failing to improve computational capabilities, not providing fine control over data polling of devices, not being flexible in connected data source devices and user interface devices, failing to create relevancy in user interface devices, wasting data resources, failing to enhance data analysis, having large data storage requirements, having a high network burden per user, and requiring high signal quality for user devices in the field.

What is needed is a system and/or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available methods and systems. Accordingly, the present invention has been developed to provide a method and/or system of data polling and/or data processing for AR/MR systems.

According to one non-limiting embodiment, there is a method of systematic data polling within a networked computing system for augmented/mixed reality display, comprising one or more of the steps of: establishing an overlay governed data stream from a persistent data storage system to an augmented/mixed reality (AR/MR) display device; receiving, over a network, pushed metric data from a plurality of remote IoT devices that are associated with networked assets, wherein it may be that the plurality of remote IoT devices are not all having the same push frequency, wherein it may be that location information of the networked assets is known to the networked computing system; storing received pushed metric data within the persistent data storage system; polling the persistent data storage system for data points from the pushed metric data; generating an overlay template; and/or publishing the pushed metric data that has been polled to the AR/MR display device, which may be according to the overlay governed data stream in association with the location data of the remote IoT devices.

It may be that the step of establishing an overlay governed data stream includes one or more of the steps of: publishing reciprocal requests of streams for assets and asset overlays between the persistent data storage system and an application programming interface; providing an overlay template to the application programming interface; and/or associating all asset data streams identified by the overlay template to a particular AR/MR device.

It may be that the step of generating an overlay template includes one or more of the steps of: selecting a networked asset; selecting an overlay object; associating the selected network asset and selected overlay object together, thereby generating an associated display widget; and/or assigning configuration data to the associated display widget.

It may be that the AR/MR device displays pushed metric data in visual association with the networked assets according to display parameters of an overlay template.

It may be that configuration data includes at least one or more of: display location information, a scripted trigger that activates a display object based on data values from the networked asset, and a polling frequency.

According to another non-limiting embodiment, there may be an augmented/mixed reality data processing system, comprising one or more of: a plurality of IoT devices associated with networked assets; a persistent data storage system that may be in functional communication with the plurality of IoII devices such that the persistent data storage system receives and stores pushed metric data from the plurality of IoT devices, the persistent data storage system which may include: a plurality of overlay templates, wherein one, more, or each may including display parameters and/or location information for associated network assets; a data storage device; and/or a body of metric data that may be associated with and sourced from the plurality of IoT devices; an overlay governed stream that may be in functional communication with the persistent storage system, which may include a polling script that may be associated with the body of metric data and/or in functional communication therewith; a body of location data regarding the networked assets; and/or an AR/MR device that may be in functional communication with the persistent data storage system via the overlay governed stream and/or with the body of location data regarding the networked assets such that updated metric data from the plurality of IoT devices is displayed in visual association with real-time visual images of the networked assets.

It may be that the plurality of overlay templates include configuration data at least including one or more of: display location information, a scripted trigger that activates a display object based on data values from the networked asset, and a polling frequency.

It may be that the overlay templates include a plurality of drag-and-drop display widgets.

It may be that the plurality of IoT devices do not all have the same push frequency.

It may be that the polling script has a polling frequency that is different from a push frequency of at least one of the IoT devices.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1:
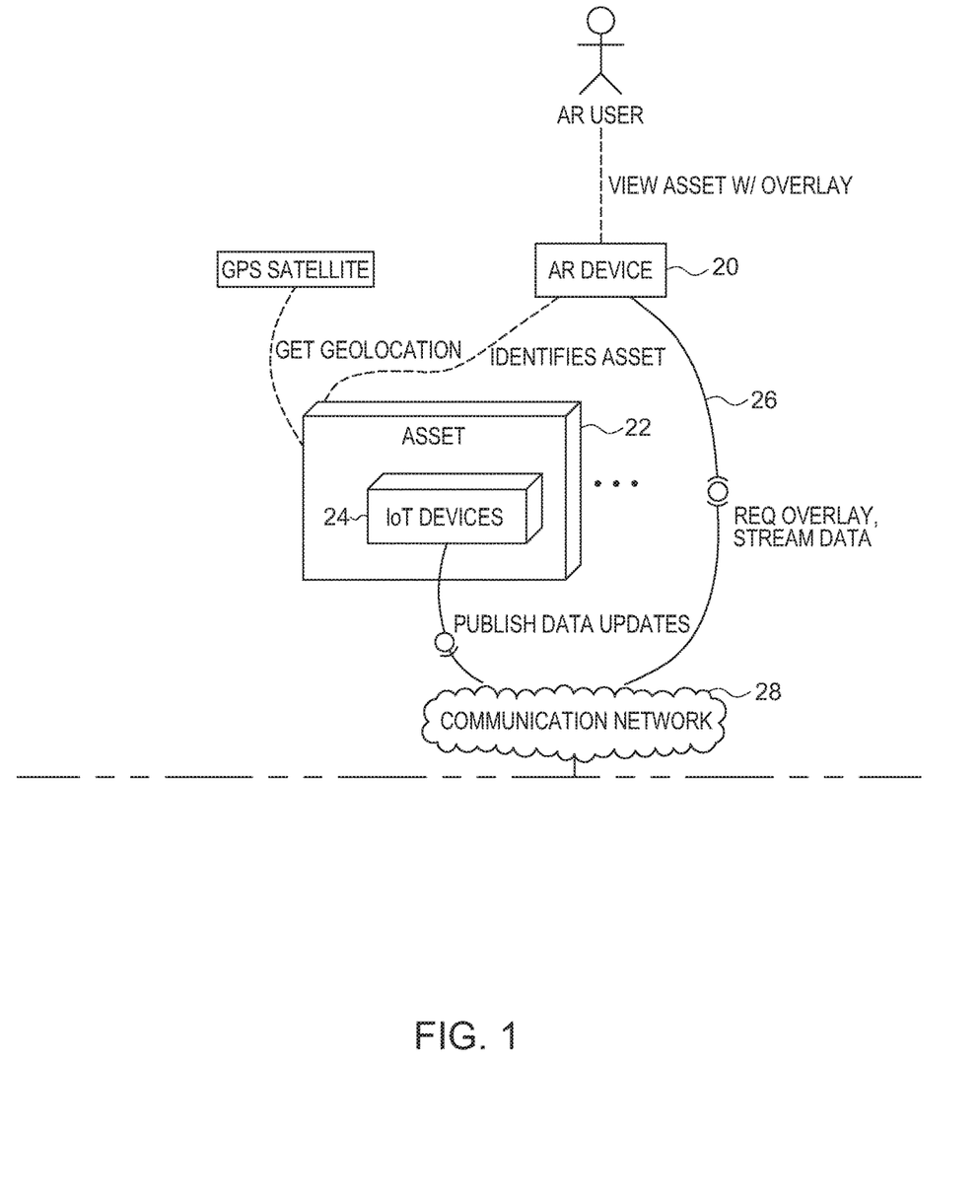
FIGS. 1 and 2, together, form a network diagram of a data processing system, according to one embodiment of the invention.
Figure 2:
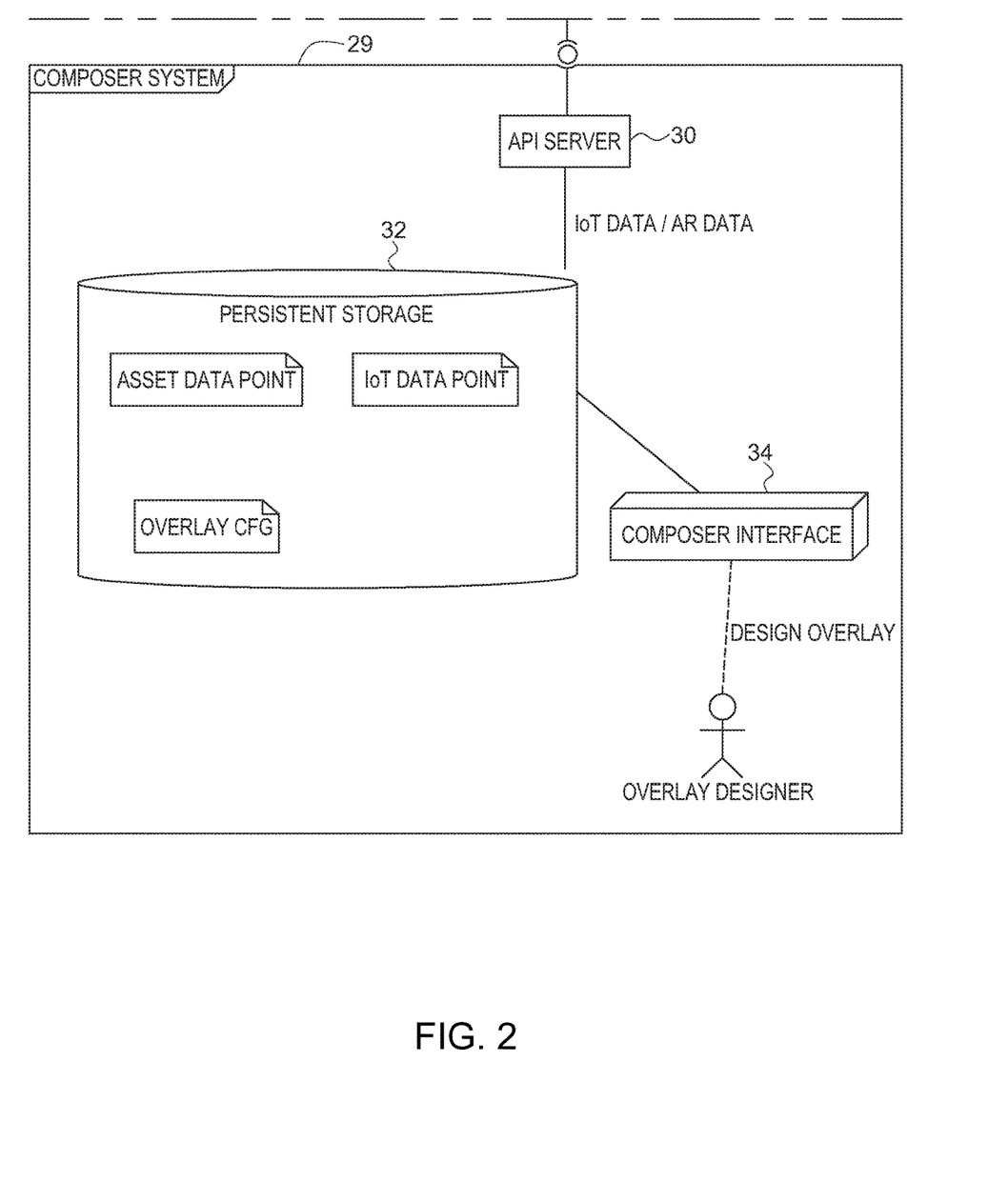

FIGS. 1 and 2, together, form a network diagram of a data processing system, according to one embodiment of the invention. The illustrated system is augmented/mixed reality data processing system. There is shown an AR device 20 and a plurality of physical assets 22 of known locations having IoT devices 24 associated therewith, each in communication with a composer system 29 having a composer interface 34, an API server 30, and persistent storage 32 containing AR interactive overlays over a computerized network 28, wherein there is an overlay governed stream 26 from the composer system 29 to the AR device 20 that feeds the AR device 20 updated data. Accordingly, the user of the AR device 20 (the illustrated AR user) view the assets 22 through the AR device 20 with the overlays displayed over the visual interface in association with the assets, the overlays displaying real-time IoT data regarding the assets.

The illustrated system can be seen as having two main areas, 1) entities inside and 2) outside the composer system. Outside the composer system 29 exists the AR device 20 which the AR user views assets. The AR device 20 identifies the asset 22(e.g. using geo-location, automated or manual methods) and sends a request through the communication network to the API server 30 in the composer system. Geo-location of the asset 22 uses location information services such as GPS Satellites.

The asset 22 itself contains one or more IoT devices 24 which gather data and publish it to the API server. The data updates are sent through the communication network to the API server 30 which stores the new values in persistent storage. This occurs whenever updates are available/pushed by the IoT devices, regardless of AR registration of the stream.

Inside the composer system 29 resides the API server, persistent storage 32 and composer interface. API requests go through the API server 30 and are stored in their appropriate data model in persistent storage. When a stream is registered by the AR device 20 the API server 30 requests data from the persistent storage 32 whenever the IoT device 24 publishes an update.

The illustrated AR device 20 provide enhanced/overlaid perceptual information (generally visual, but may include others, such as but not limited to haptic, somatosensory and olfactory) contemporaneously with and in association with (generally as a perception overlay) real-world environments. The enhanced perceptual information may be constructive, in that it adds information/objects to the experience, and/or may be destructive, in that it masks/removes information/objects from the real-world environment. An AR device 20 may also be a mixed reality (MR) device herein virtual reality elements are included, such as but not limited to registering virtual objects in the real-world space that is being perceived. The illustrated AR/MR device 20 is in functional communication with the persistent data storage system via the overlay governed stream 26 and with the body of location data regarding the networked assets 22 such that updated metric data from the plurality of IoT devices 24 is displayed in visual association with real-time visual images of the networked assets.

AR devices generally include a processor, a display, sensors (e.g. accelerometers, gyroscopes, signal strength sensors, GPS devices, cameras, microphones), and input devices along with associated hardware, such as but not limited to memory, data busses, power supplies, video cards, audio cards, network devices, speakers, haptic engines, and the like. There are various implementations of AR devices, including but not limited to eyeglasses, goggles, contact lenses, HUDs, virtual retinal displays, handheld devices (e.g. smartphone, tablet), and the like and combinations thereof. The following are non-limiting exemplary AR eyeglasses (smartglasses) the MOVERIO BT-300 by Epson of Liss Alamitos, Calif.; the Raptor by Everysight of Haifa, Israel; and the Google Glass Enterprise Edition by Google of Mountain View, Calif. The AR device 20 is capable of identifying/recognizing networked assets 22 via location information of the assets, which may also require location information of the AR device. Accordingly, when the AR user looks towards a networked asset 22 and has a corresponding overlay template or widget that is associated with that networked asset, the AR user sees information about that networked asset 22 in physical registration with that networked asset, as presented by the overlay template/widget. When the AR user looks away, the information is no longer visible, unless the template/widget is programmed to continue displaying the information (e.g. on a border of the display angularly positioned towards the actual location of the networked asset). There may also be visual markers (e.g. QR codes, object recognition software within the AR device) that facilitate in allowing the AR device 20 to recognize networked assets 22 and display overlay data properly in association therewith.

The illustrated overlay governed stream 26 is in functional communication with the persistent storage 32 system such that updated data from relevant IoT devices 24 is published to the AR/MR device. The overlay governed stream 26 may include a polling script associated with the body of metric data that manages polling the persistent storage 32 for the metric data (e.g. type of polling, frequency of polling, data types, data ranges, scripted decision trees/matrices for changes in polling, alert/alarm thresholds). The polling script may be an additive compilation of individual polling scripts from the various overlays templates that have been selected/modified by the overlay designer and/or AR user in designing the overlays and/or selection options made when implementing the overlays into a particular AR experience (e.g. where to drop the widget when dragging and dropping which may register the widget a particular angular/positional distance from the asset, a display color scheme may be selected via menu when selecting/placing the widget, a range of alarm status triggers may be altered on select/placement/use of a particular widget). The polling script may have a polling frequency that is different from a push frequency of at least one of the IoT devices. There may be a plurality of polling frequencies, as each widget/overlay template may have its own polling script with its own polling type/frequency. The polling frequency of an overlay template does not need to match up with a push frequency of an associated IoT device.

The illustrated assets 22 are physical objects and/or locations. Non-limiting examples include: sites of interest (e.g. churches, statues, businesses, historical markers), industrial objects (e.g. valves, mixing tanks, boilers, furnaces, storage tanks, pumps, batteries, turbines), vehicles (e.g. trucks, cars, mowers, units within an automated fleet of vehicles, drones), objects of interest (e.g. museum displays, tour waypoints, interactive educational objects), networked devices (e.g. servers, smartphones, cellular phones, pagers, relay stations, hubs), and the like and combinations thereof. The illustrated assets 22 include IoT devices 24 that have sensors and publish data updates to the illustrated communication network. Accordingly, the assets 22 are networked assets, as they are associated with a network (some assets may be networked assets via association with multiple networks and/or association with the same network in multiple modes). Assets 22 have a physical location and that location may include one or more orientations (e.g. direction a car is facing/traveling). The asset 22 itself may "know" its location information, such as but not limited to a GPS device within the asset 22 that, via the illustrated GPS satellite, determines the asset's location. The location of the asset 22 may be determined by other sensors (e.g. position sensors along a track, motion detectors, accelerometers, signal strength detectors). The location of the asset 22 may be fixed and may be registered with one or more components described herein. Non-limiting examples of global positioning modules include: a global positioning system described in U.S. Pat. No. 6,002,363, issued to Krasner, which is incorporated for their supported teachings herein; a Gannine Trex Hiking GPS receiver, manufactured by Garmin International, Inc., 1200 East 151st Street, Olathe, Kans., 66062, USA.

A collection of networked assets 22 may include a wide variety of IoT devices 24 that may be from diverse manufacturers, made at different times, installed in different production sessions, using different communication protocols, providing data in different formats, providing data updates at different polling/interrupt (push) cycle frequencies, and etc. Accordingly, the collective IoT devices 24 feed of a collection of networked assets 22 may be very complicated and may be very difficult/complicated to manage. Further, as additional needs are identified and/or as new assets 22 are included over time, the complexity and difficulty may compound over time.

The illustrated IoT devices 24 include sensors and network communication hardware so that they are able to publish data updates over the communication network. They will also generally include some sort of identifying metadata (e.g. sensor number, registration ID) to differentiate themselves from other IoT devices 24 and that information may be communicated along with the published data. Non-limiting examples of sensors include: vibration sensors (e.g. geophone, hydrophone, microphone, seismometer), chemical sensors (e.g. Co2 sensors, carbon monoxide detectors, chemoresistors, hydrogen sensors, optodes, ozone monitors, smoke detectors), electricity sensors (e.g. current sensors, electroscopes, galvanometers, hall probes, magnetometers, voltage detectors), environmental sensors (e.g. air pollution sensors, moisture sensors, humistors, gas detectors, rain/snow gauges, actinometers), flow sensors (e.g. air flow metes, anemometers, gas meters, mass flow sensors), navigation sensors airspeed indicators, altimeters, gyroscopes, GPS sensors, depth gauges, turn coordinators, variometers), position sensors (e.g. auxanometers, capacitive displacement sensors, flex sensors, gravimeters, impact sensors, inclinometers, odometers, tilt sensors), optical sensors (e.g. CMOS sensors, colorimeters, flame detectors, LED light sensors, photodetectors), pressure sensors (e.g. barograph, boost gauges, piezometers, Pirani gauges), force sensors (e.g. load cells, strain gauges, bhangmeters, torque sensors), thermal sensors (e.g. bolometers, thermometers, radiometers, themisters) and the like and combinations thereof. Network communication hardware may include network cards, cellular adapters, Bluetooth devices, infrared transmitters/receivers/transponders, and the like and combinations thereof.

The illustrated network includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference. A non-limiting example of a network card may be a Belkin Gigabit Ethernet Express Card, manufactured by Belkin International Inc., 12045 E. Waterfront Dr., Playa Vista, Calif., 90094.

The illustrated composer system 29 includes an API server, a persistent storage system 32, and a composer interface, each in communication with each other as needed to perform their various operations. The composer system 29 allows for an overlay designer to design a plurality of overlay templates that the AR user may then use to populate their perception experience with enhancements/overlays, generally in the form of drag-and-drop widgets that the user can incorporate into their AR interface which then automatically provide data updates in association with the networked assets 22 through the field of view of the AR user's AR device.

The illustrated API server 30 provides control and management over data incoming from the networked assets 22 and their IoT devices 24 as well as providing a portal between the AR devices of the AR users and the persistent storage 32 of the composer system. The server will generally include a processer, memory, data busses, network communication hardware and software, along with other hardware/software utilized therewith. Non-limiting examples of servers include: a HP MediaSmart Server EX495, manufactured by Hewlett-Packard Company, 3000 Hanover Street, Palo Alto, Calif., 94304, USA; a Intel Server System SR2500ALBKPR, manufactured by Intel Corporation, 2200 Mission College Blvd, Santa Clara, Calif., 95054, USA.

The illustrated persistent storage 32 collects and stores data in service of one or more portions of the system, as appropriate to the functions thereof. The data storage system is in communication with the various modules and components of the system over a computerized network 28 and stores data transferred there through (e.g. in functional communication with the plurality of IoT devices 24 such that the persistent data storage system receives and stores pushed metric data from the plurality of IoT devices). Data storage systems may include databases and/or data files. There may be one or more hardware memory storage devices, which may be, but are not limited to, hard drives, flash memory, optical discs, RAM, ROM, and/or tapes. A non-limiting example of a data base is Filemaker Pro 11, manufactured by Filemaker Inc., 5261 Patrick Henry Dr., Santa Clara, Calif., 95054. Non-limiting examples of a data storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated persistent storage system 32 includes a plurality of overlay templates, one or more data storage devices, asset data points, and IoT data points.

The overlay templates may each include display parameters and location information for associated network assets. The plurality of overlay templates include configuration data, generally at least including one or more of: display location information, a scripted trigger that activates a display object based on data values from the networked asset, and a polling frequency. The overlay templates may be embodied as drag-and-drop display widgets.

The asset data points include meta data regarding the networked assets. Such may include location information (e.g. position, orientation), name/ID, operational data (e.g. tolerances, operating ranges, warning messages, historical information, installation information, repair information, MSDS sheet information). Together, a collection of asset data points form a body of location data regarding the networked assets.

The IoT data points are a body of metric data associated with and sourced from the plurality of IoT devices.

The illustrated composer interface 34 allows the overlay designer to create overlay templates/widgets. This interface has access to asset 22 and IoT data models/points. Once saved in persistent storage 32 the overlay data model is pushed to the AR device 20 when a stream is requested for a given asset. The API server 30 associates IoT data points with the overlay to create the stream and publish updates according to the polling script of the overlay/widget.

In one non-limiting embodiment, there is a system wherein data sources report tagged data to a server. It may be that the data sources are geo-tagged when they are installed. If the data source is a moving source then the data packets will include position information, which may come from onboard position sensors.

In another non-limiting embodiment, there is a server with input from IoT devices that is parsed against an input template and stored in persistent storage. There may be one or more overlay templates that determines how often the data within the persistent storage is polled, how the data is conditioned, how it is pre-analyzed (e.g. position and time data turned into velocity/acceleration data), safety ranges (e.g. when to push data and/or push the display of data to AR user devices even if they would otherwise display it), and how the building blocks are populated to be ready for the widgets, which get sent to the user device for display.

In still yet another embodiment, there is an AR user interface device with position and orientation sensors. The user device includes widgets that are active (e.g. displayed or non-displayed but still active) and that generate queries that are sent to the server to get the blocks of data necessary for the interface to properly display the widgets.

In operation, illustrated system allows parsing of IoT data sources (e.g. coming in the form of a RESTful API) which may determine the type of data that is available in the data source, the values, and/or the potential rendering of that data in a user interface. This information is maintained into blocks/widgets/templates in persistent storage that are pre-populated with the data actually coming from the data source. The blocks have properties and the properties allow for the blocks to be positioned onto the screen of an AR device, connected to the data source and rendered in a way that is meaningful for the specific kind of data. The data may include relative position and orientation of the data source with respect to the user and the AR device has access to its own position and orientation data. There may be metadata (e.g. describing the IoT device 24 and/or networked asset) which can be presented to the user along with information such as position and events happening around a user. The position and orientation data of the user and data sources are incorporated into the display widgets to allow the system to synergistically display information to the user on the display device. As a non-limiting example, a user may be viewing a particular data source and see data displayed associated with that data source. There may be an alert on another data source which may have been triggered by un-displayed data being outside of a particular predefined range (e.g. temperature in a mixing tank being too high or rising too fast) cause a flashing red arrow to appear on the screen pointing in the direction that the user needs to look in order to view a second data source and that arrow continues to display until the user changes their view to view the second data source.

Advantageously, the illustrated system (and method described in FIG. 3), synergistically combines a great variety of push/pull interrupt and data polling techniques of a complicated IoT system into an easily managed and operated system. The synergistic combination greatly reduces network traffic, especially to remote AR devices; reduces minimum operating performance standards for AR devices; allows for use of legacy devices within the system in combination with state of the art devices without complicated data conditioning systems; reduces the cost and time required to install and implement networked asset AR/MR systems, and reduces power consumption for networked AR/MR devices.

Figure 3:
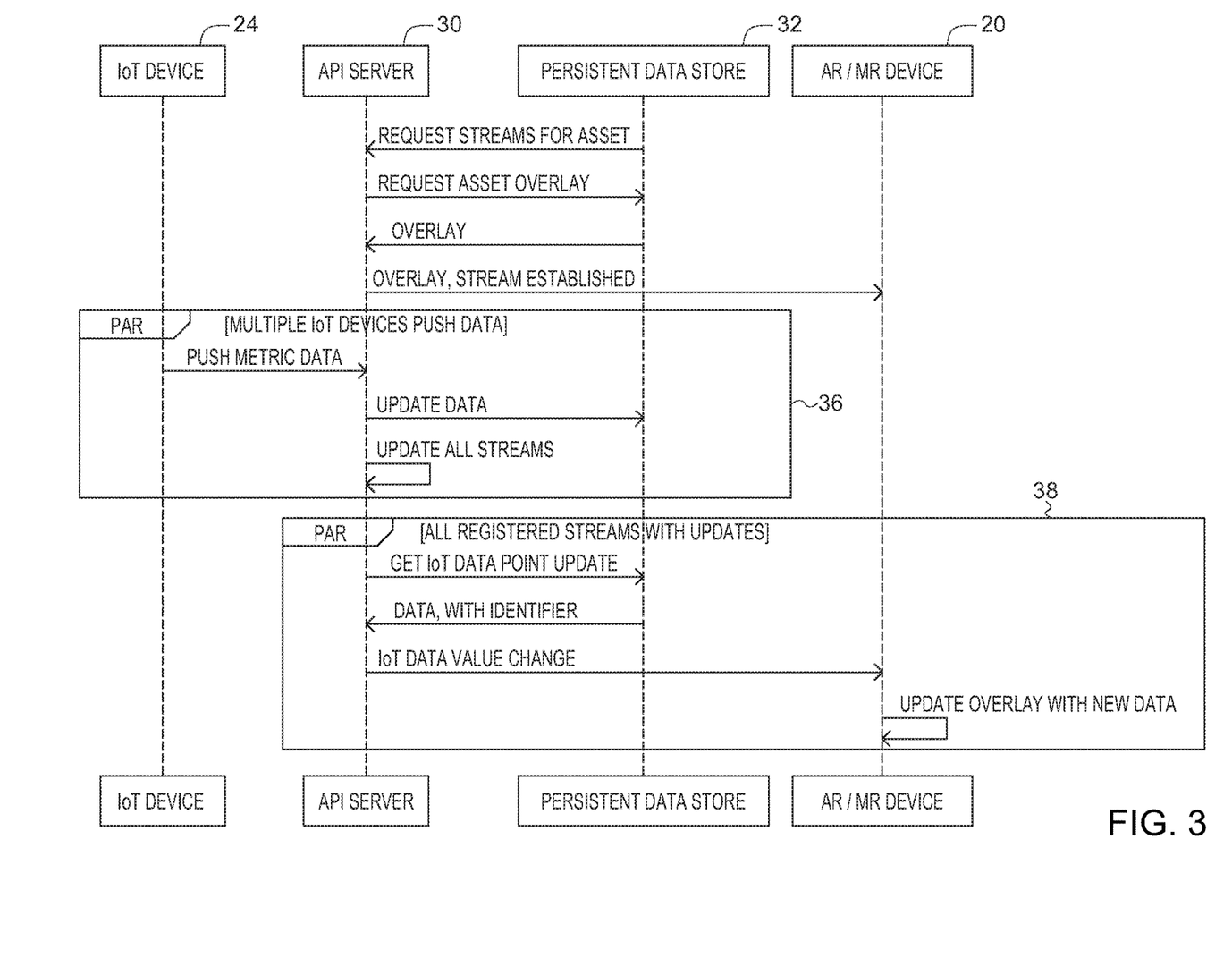
FIG. 3 is a sequence diagram of a method of systematic data polling according, to one embodiment of the invention.

FIG. 3 is a sequence diagram of a method of systematic data polling according, to one embodiment of the invention. There is shown a method of systematic data polling within a networked computing system for augmented/mixed reality display, wherein an IoT device, and API server, a persistent data store 32 (persistent storage system), and an AR/MR device, each in functional communication as needed to performed the illustrated steps, interoperate to provide systematic data polling.

Initially, the method includes establishing an overlay governed data stream from a persistent data storage system to an augmented/mixed reality (AR/MR) display device.

This generally begins with publishing reciprocal requests of streams for assets and asset overlays between the persistent data storage system and an application programming interface. The illustrated persistent data store requests streams for the networked assets (i.e. the data updates from the IoT devices), which the API server 30 provides via the illustrated [Multiple IoT Devices Push Data] box 36. The illustrated API server 30 requests asset overlays from persistent data store as required for the particular user of the AR device. The persistent data store provides the requested overlay template (s) to the API server 30 which the API server 30 then uses to associate all asset data streams identified by the overlay template to a particular AR/MR device, thereby feeding the AR device 20 of the AR user. Such may occur automatically on a particular AR user logging into a particular AR device 20 or type of AR device on the network. The overlay templates include configuration data, which may include one or more of display location information, a scripted trigger that activates a display object based on data values from the networked asset, and a polling frequency. Accordingly, once the persistent data store is in receipt of data updates from the IoT devices and the API server 30 is in receipt of the relevant overlays of a particular AR device user, the overlay governed stream is established and the API server 30 may then be able to provide that data stream to the AR device.

As a user of the AR/MR device 20 includes a particular asset 22 within the view of the user, the AR/MR device will identify the asset 22 through gels-location, automatic detection, and/or human driven manual detection methods. Once identified the AR device 20 may request a stream of asset related data points which come from the IoT Devices associated with the Asset. Alternatively, the AR device 20 may receive data from the overlay governed stream for all associated overlay templates/widgets, even for those assets those not in view of the AR/MR device.

The API server 30 returns the IoT data point identifiers and their relative layout positions (e.g, via overlay configuration/template). The AR device 20 creates the overlay and displays it for the user, updating the data displayed whenever IoT data point updates are pushed to the stream.

During this same period, the API server 30 and/or the persistent data store are receiving, over a network, pushed metric data from a plurality of remote IoT devices that are associated with networked assets. It may be that the plurality of remote IoT devices do not all have the same push frequency. Further, location information of the networked assets is known to the networked computing system (e.g., the API server 30 and/or the persistent data store). IoT devices push metric data to an APE server. The API server 30 stores this data into a persistent data store, such as but not limited to a database, or file for future access. This allows the API server 30 and/or the AR device 20 to poll the persistent data store and/or the API server 30 for data points from the pushed metric data and thereby publish data (see the [All Registered Streams with Updates] box 38) to AR device(s) that registered for streaming data according to the overlay governed data stream in association with the location data of the remote IoT devices. Thereby the AR/MR device 20 may display pushed metric data in visual association with the networked assets according to display parameters of an overlay template.

Updated IoT data points may be read by the API server 30 and pushed in a stream to the AR Device. The AR device 20 will update its display with regards to the overlay configuration as data in persistent storage 32 is polled via the overlay governed stream 26 according to the polling configuration of the overlay governed stream 26 (e.g. the accumulation of polling scripts of the incorporated overlay templates).

Figure 4:
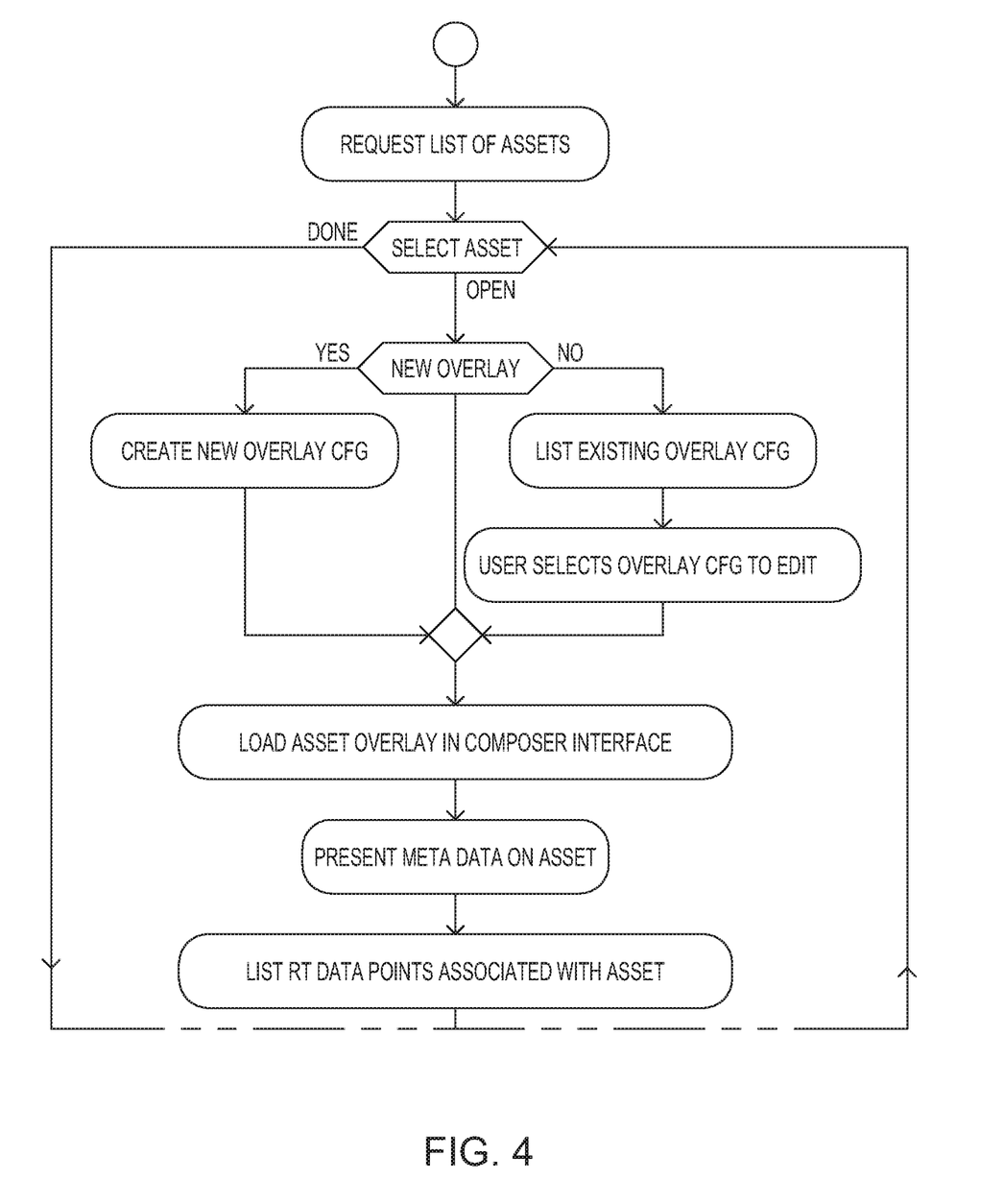
FIGS. 4 and 5, together, form a flow chart of a method of creating an overlay, according to one embodiment of the invention.
Figure 5:
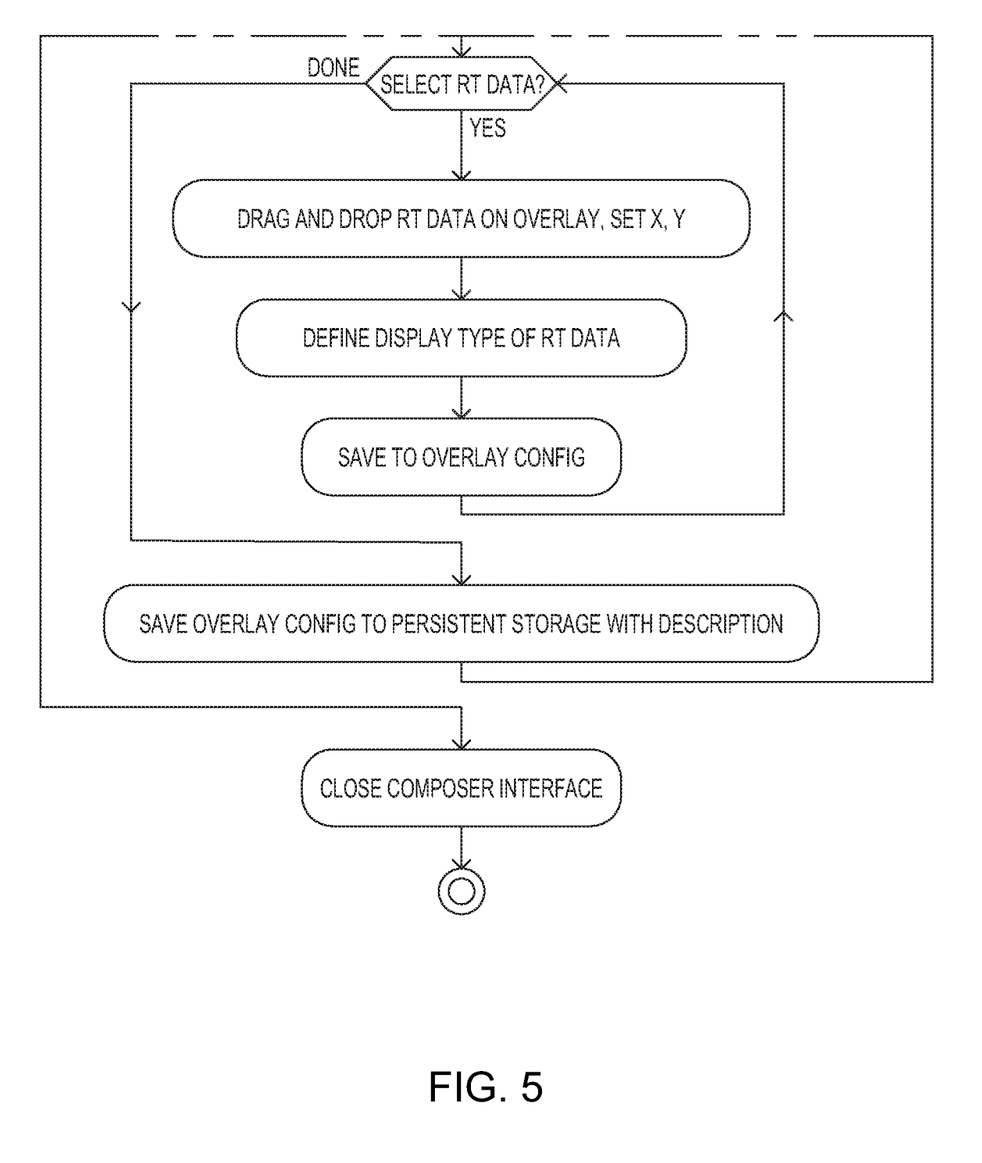

FIGS. 4 and 5, together, form a flow chart of a method of creating an overlay, according to one embodiment of the invention. The method begins with a request for a list of assets, proceeds to a sequence wherein an asset is selected and an overlay is created in association with the selected asset, the overlay is configured, saved, and then the process is terminated on closure of the composer.

The flow of creating an overlay is executed within the device containing the composer interface. Such may be, but is not limited to a PC, dumb terminal of a server, laptop, tablet and/or mobile device. The user is provided a list of assets as defined in the persistent storage. Once selected, the user can either create a new overlay configuration or update a currently existing overlay. The overlay is associated with the asset thereby generating an associated display widget. The overlay configuration for the given asset is then loaded into the composer interface. Meta data about the asset is generally displayed to facilitate a complete understanding of overlay to be created.

A list of real-time data points associated with the Asset are provided to the user. The user selects the data point and the destination on the overlay, recording the relative position to the other data points currently displayed. The user selects the type of display method for this data point, e.g. Textual Output, Warning Lights, Meter, etc. Any necessary configuration for the display method would be performed here, e.g. setting value ranges to display "green", "yellow", "red" lights. Selections may be the user are assigned as configuration data to the associated display widget.

The user repeats the RT Data assignment process until the overlay design is completed. The overlay configuration is saved to persistent storage where it can be later loaded by the AR/MR Device. The process can be repeated with additional assets.

Once the user has created all necessary Overlays, the Composer Interface can be closed.

Figure 6:
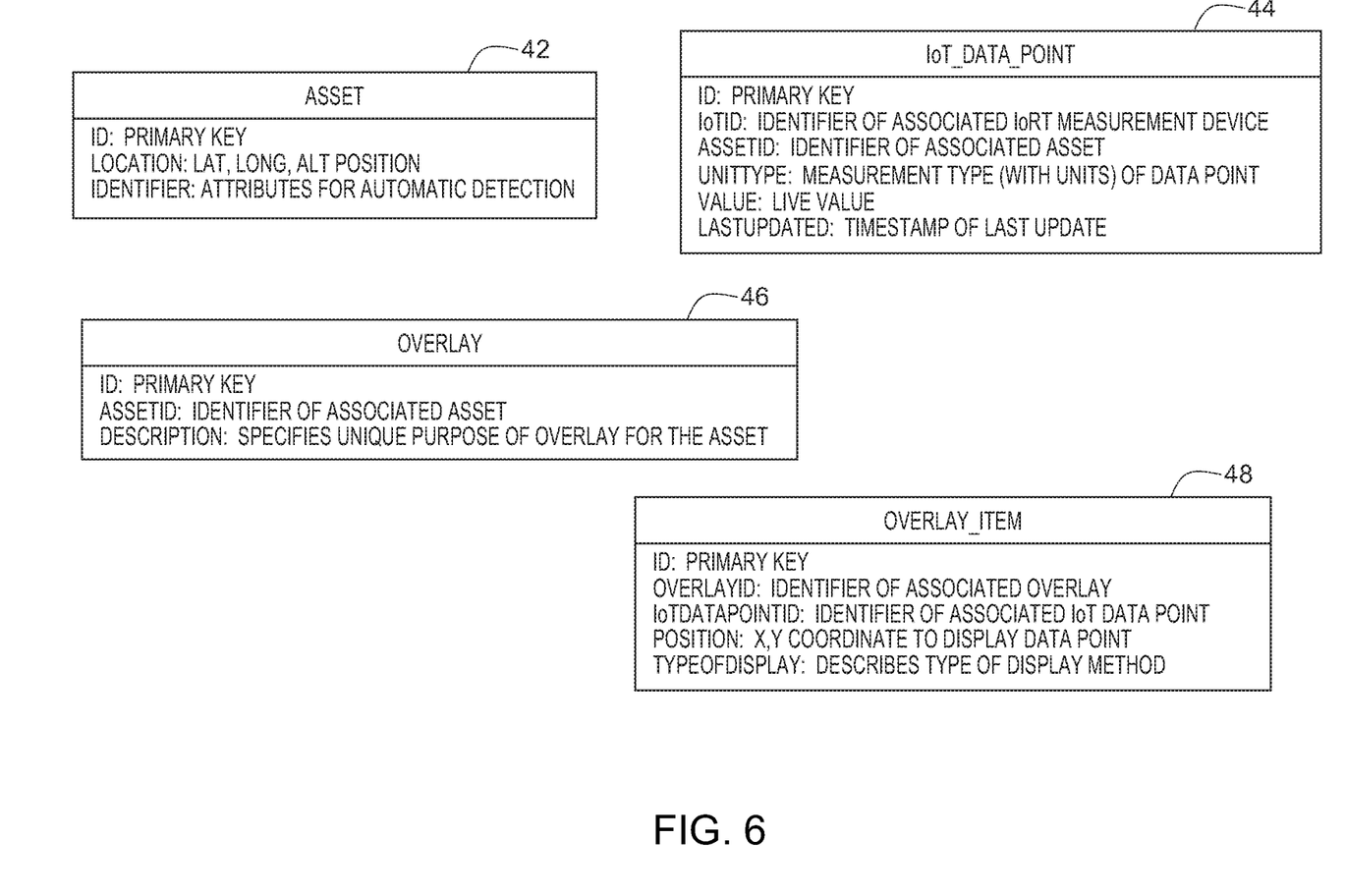
FIG. 6 shows a plurality of data models, according to one embodiment of the invention.

FIG. 6 shows a plurality of data models, according to one embodiment of the invention. There is shown an Asset Data Model 42 (top left), an IoT_Data_Point Model 44 (top right), an Overlay Data Model 46 (middle), and an Overlay_Item Data Model 48 (bottom). The illustrated data models illustrate non-limiting exemplary data models for use in a data polling/processing system.

The Asset Data Model represents the physical asset the AR/MR Device will project an overlay with live streaming data. The model contains the geo location and identification metrics to associate the view of the AR device to a physical asset. Location contains the geo location information that will be updated as the asset moves. Identifiers contains any information used for non-geo location based identification.

The IoT_Data_Point Data Model represents the physical IoT measurement device attached to an asset. The model contains identifiers to associate the data point with the IoT Device, IoTID, as well as the Asset, AssetID. The UnitType field defines the type of value being measured, e.g. Speed in mph. Value and LastUpdated contain the latest value and time of update respectively. When new data is pushed from the IoT Device, these fields will be updated.

The Overlay Data Model represents the Overlay created by the Composer Interface. The model will contain an association to an Asset, AssetID. The Description provides context to the AR/MR Device user to select the appropriate overlay for the situation, e.g. "Tractor in repair mode" or "Tractor in harvest mode". The AR Device user will see all overlays for the given Asset and will select which to display.

Individual data points will be modeled in Overlay_Item. The item model contains a reference to the overlay, OverlayID, and the IoT Data Point, IoTDataPointID. The position on the overlay is assigned to Position with the method of displaying defined in TypeOfDisplay. Data Values can be represented in multiple ways, e.g. text, warning lights, meters, graphs.

Figure 7:
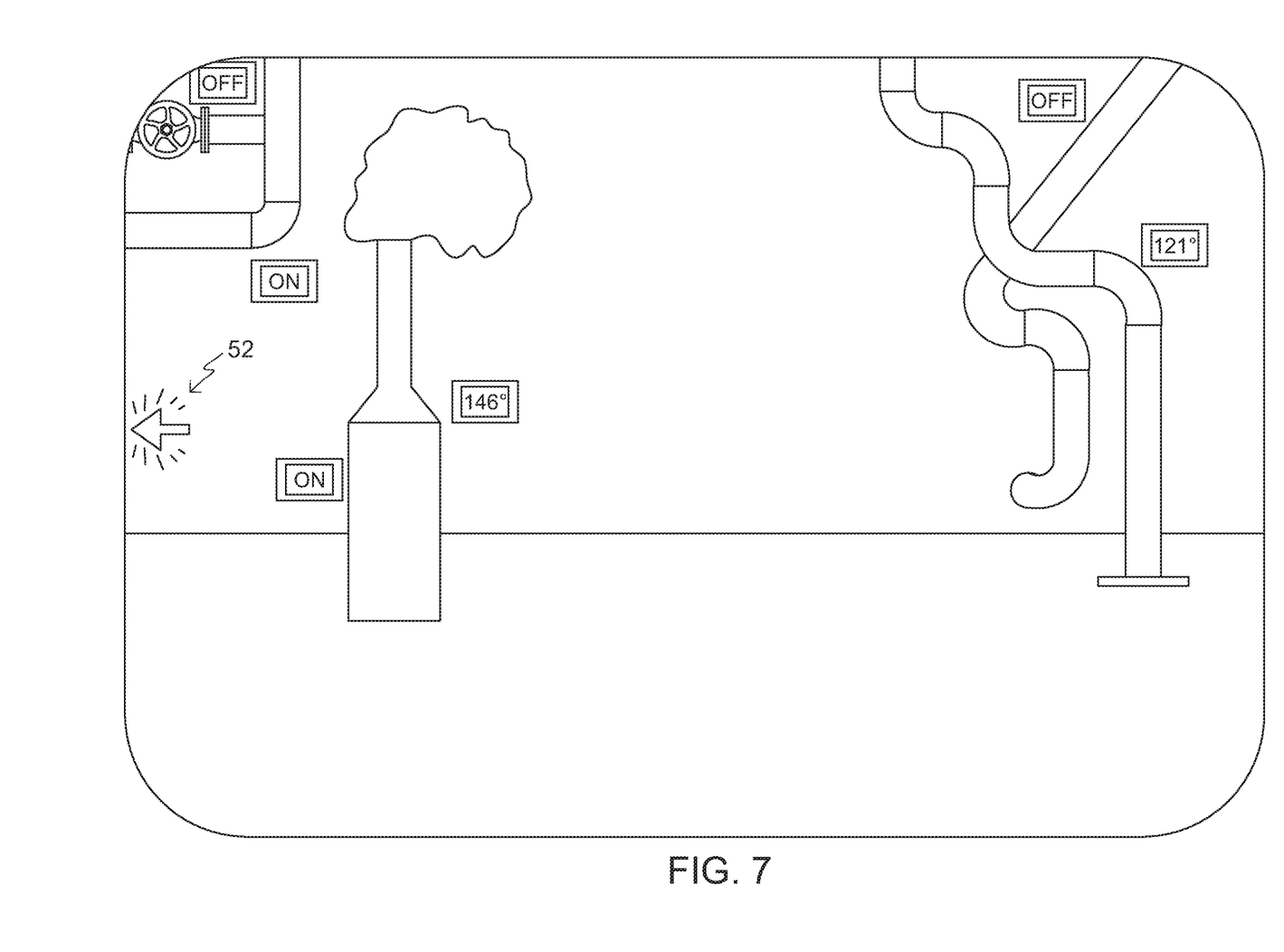
FIGS. 7-9 illustrate prophetic user interface views for an AR/MR device, according to one embodiment of the invention.
Figure 8:
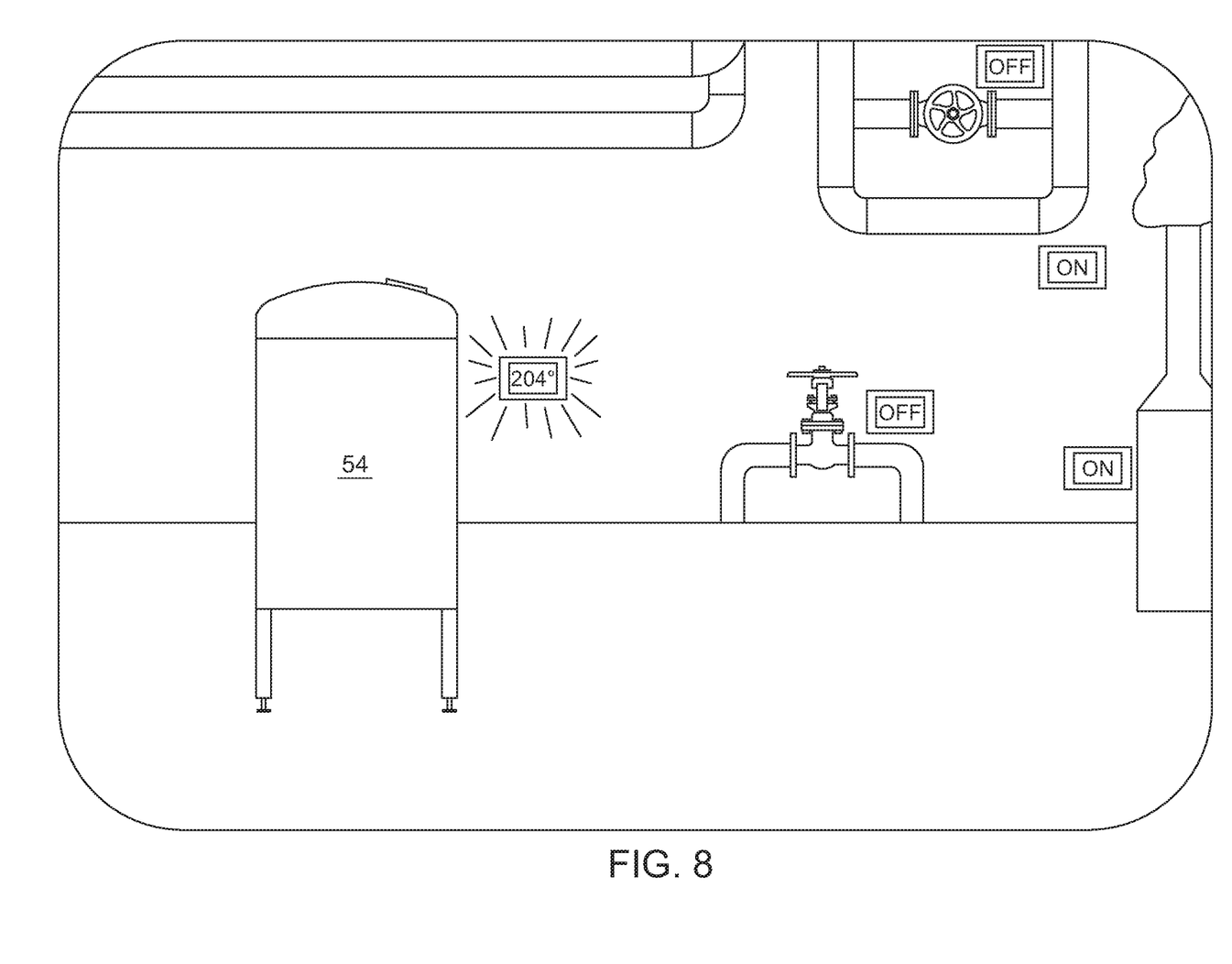
Figure 9:
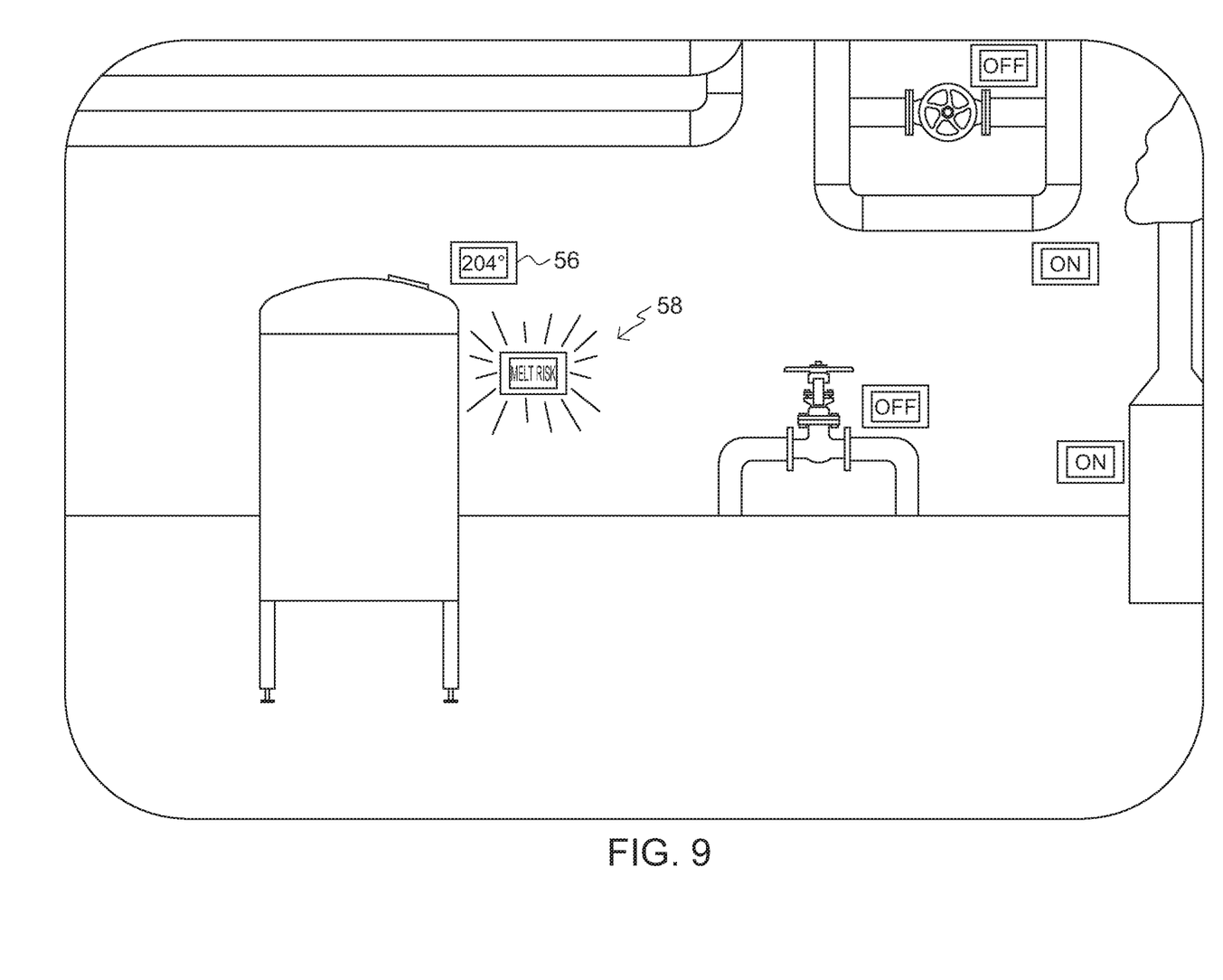

FIGS. 7-9 illustrate prophetic user interface views for an AR/MR device, according to one embodiment of the invention. There is shown a plurality of views, as seen by an AR user through an AR/MR device. FIG. 7 shows an initial view with a flashing arrow 52 notifying the user of an alert related to a networked asset 54 that is not visible in the current view and notifying the user of a direction of orientation change that will bring that networked asset 54 into view. FIGS. 8 and 9 show the networked asset 54 on alert in view. FIG. 9 shows an alternative widget configuration for that same networked asset on alert as compared to that shown in FIG. 8, wherein two widgets 56, 58 are included for a single networked asset. The two illustrated widgets may be different widgets utilizing the same IoT device data or they may be pulling data from two different IoT devices that are associated with the same networked asset.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. An augmented/mixed reality data processing system, comprising:
   a. a plurality of IoT devices associated with networked assets;
   b. a persistent data storage system in functional communication with the plurality of IoT devices such that the persistent data storage system receives and stores pushed metric data from the plurality of IoT devices, the persistent data storage system including:
      i. a plurality of overlay templates, each including display parameters and location information for associated network assets;
      ii. a data storage device; and
      iii. a body of metric data associated with and sourced from the plurality of IoT devices;
   c. an overlay governed stream in functional communication with to persistent storage system, including a polling script associated with the body of metric data and in functional communication therewith;
   d. a body of location data regarding the networked assets; and
   e. an AR/MR device in functional communication with the persistent data storage system via the overlay governed stream and with the body of location data regarding the networked assets such that updated metric data from the plurality of IoT devices is displayed in visual association with real-time visual images of the networked assets.

2. The system of claim 1, wherein the plurality of overlay templates include configuration data at least including one or more of: display location information, a scripted trigger that activates a display object based on data values from the networked asset, and a polling frequency.

3. The system of claim 1, wherein the overlay templates include a plurality of drag-and-drop display widgets.

4. The system of claim 1, wherein the plurality of IoT devices do not all have the same push frequency.

5. The system of claim 1, wherein the polling script has a polling frequency that is different from a push frequency of at least one of the IoT devices.

* * * * *